Patented Oct. 20, 1953

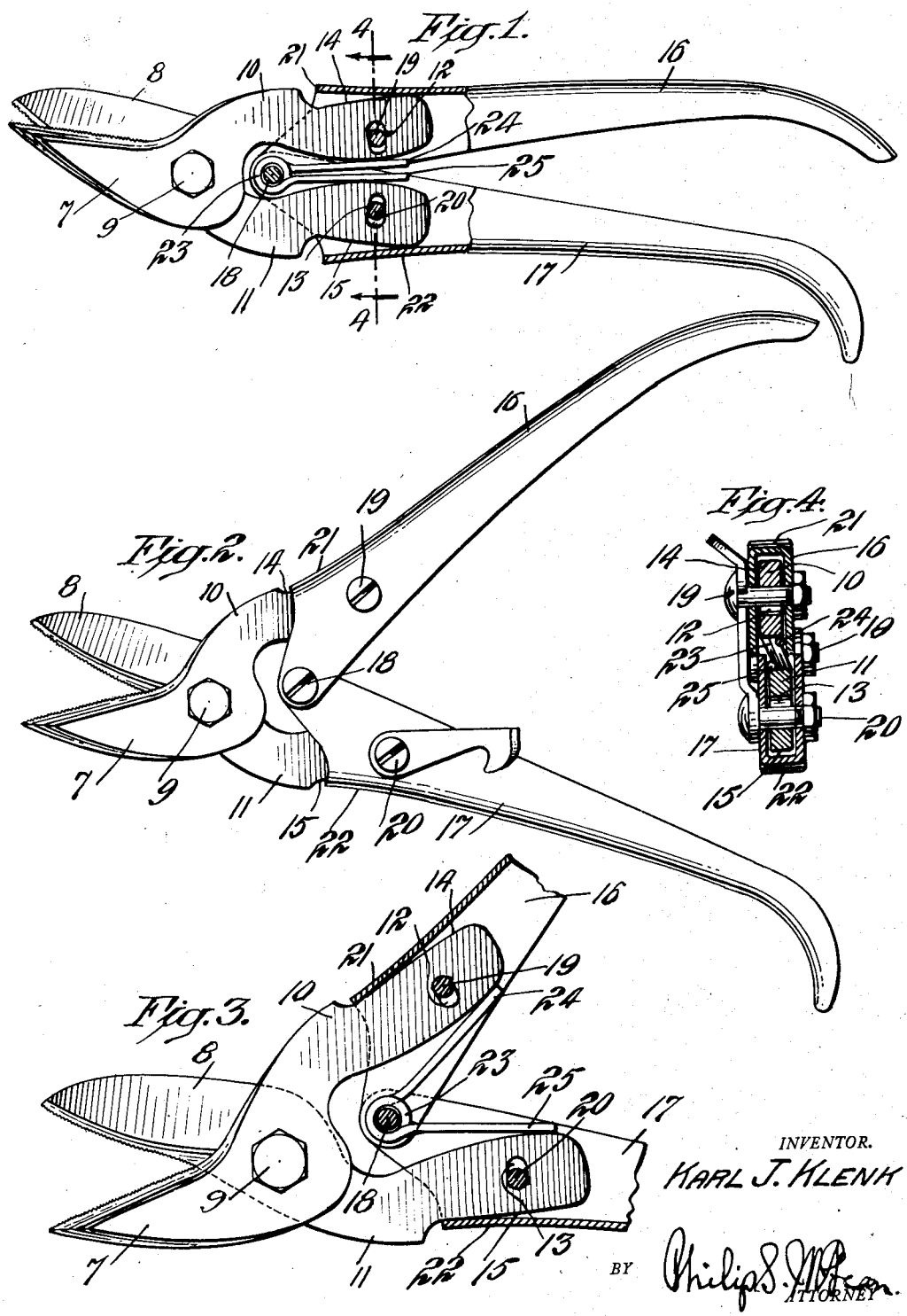

2,655,722

UNITED STATES PATENT OFFICE 2,655,722

CAM CLOSING HAND TOOL

Karl J. Klenk, Wilmington, Del.

Application May 24, 1952, Serial No. 289,777

3 Claims. (Cl. 30—252)

The invention herein disclosed relates to hand tools in the nature of shears and pliers, in which the working jaws, whether they be of the cutter or gripper type, are actuated by hand grip levers.

Special objects of the invention are to provide a heavy duty tool of this character which will have wide opening jaws and which will have the hand levers coupled to the jaws in such a way as to permit the wide opening effect without too much spread of the hand levers and which will apply gradually increasing, powerful leverage in effecting the closing action of the jaws.

Important objects of the invention also are to provide a tool of these characteristics which will consist of but few rugged parts, which can be produced and assembled at a reasonable cost and in which the operating parts will be fully covered and protected against injury or the possibility of injuring the user.

These and other desirable objects are attained largely through a novel construction in which the hand levers are connected with the working jaws by a sliding cam construction arranged to permit the jaws to have a wide opening movement and to start the jaw closing action with a relatively short leverage, increasing to a long, powerful leverage as the jaws continue the closing movement.

Other important novel features of the invention are set forth and will appear in the course of the following specification.

The drawing accompanying and forming part of the specification illustrates a present practical embodiment of the invention. Structure, however, may be modified and changed as regards the immediate illustration, all within the true intent and broad scope of the invention as hereinafter defined and claimed.

Fig. 1 in the drawing is a side elevation of the tool in the closed relation, with portions of the hand levers broken away and appearing in section;

Fig. 2 is a side elevation showing the tool in fully opened position;

Fig. 3 is a broken part sectional detail showing the parts as they appear in Fig. 2;

Fig. 4 is a cross sectional view taken on substantially the plane of line 4—4 of Fig. 1.

The tool chosen for purposes of illustration is a metal shears or snips in which the working jaws 7 and 8 are in the form of companion cutter blades.

These are shown pivotally connected together intermediate their ends by a pivot bolt 9, and they are further shown as having longitudinally elongated leverage extensions 10 and 11 projecting rearwardly of the pivotal connection.

Additionally, these leverage extensions are shown provided near their ends with transversely extending slots 12, 13, and with convexly curved cam surfaces 14, 15, along their outer edges.

The hand levers 16, 17, are shown as of folded sheet metal, substantially U-shape in cross section, having substantially parallel side walls pivotally connected together at their forward ends by a pivot bolt 18 which in the assembled relation, is disposed rearwardly of, but relatively close to, the jaw pivot.

The parts are fitted together as shown in Fig. 1, with the leverage extensions of the working jaws entered in the open ended channels of the U-shaped handles at opposite sides of the handle pivot 18.

After such assembly, securing screws or studs 19, 20, are passed through the sides of the handles and through the transverse slots 12, 13, in the jaw extensions.

The parallel sides of the handles then hold the jaws confined against objectionable sideways movement, and the tendency of the securing pins or screws 19, 20, in the closing action is to draw the jaws relatively more fully back into the channels of the handles, as will be apparent by comparison of Figs. 2 and 3 with Fig. 1.

A special feature of the invention is that the slots 12, 13, in the jaw extensions are of sufficient extent transversely of said extensions to permit the cam edges 14, 15, of the jaw extensions to engage the inner surfaces of the arched or crown portions 21, 22, which connect the side walls of the channels at the beginning and continuing through the closing movement of the hand levers and jaw levers.

These connecting back portions of the channels also are shown as longitudinally curved convexed inwardly toward the curved bearing edges of the jaw extensions.

These reversely curved, companion cam surfaces are proportioned to effect engagement between the forward edges of the handle cams 21, 22, and forward portions of the jaw extension cams 14, 15, at the beginning of the jaw closing movement, Fig. 3, and rearward sliding engagement of these cam parts as the jaws approach closed position, ending as shown in Fig. 1, with the handle cams engaging the rearmost end portions of the jaw cams. In this way the jaws are permitted a wide opening movement without too great a spread of the handles, and the closing movement of the jaws is started with a quick action which increases in leverage and power as the engagement between the hand lever and jaw lever cams progresses rearwardly toward the ends of these levers.

A spring 23 is shown coiled about the handle pivot 18 and having its free ends 24, 25 extended rearwardly into engagement with the inner edges of the jaw extensions.

This handle and jaw opening spring is housed within the channels of the handles, along with the leverage extensions of the jaws, so that all these parts are protected and guarded and the tool presents an externally smooth appearance.

The tool consists of but few, rugged parts and these are compactly arranged so that for the work performed the tool may be of comparatively small size and light weight.

What is claimed is:

1. A cam closing hand tool comprising a pair of pivotally connected hand levers having longitudinally extending channels open at the pivotally connected ends of said levers, a pair of pivotally connected jaw levers entered in the open ends of said channels, the outer edges of said jaw levers and the inner surfaces of said channels in the hand levers having companion cam surfaces in rolling, sliding engagement in the closing action of the hand levers and jaw levers, one pair of said levers having transversely extended openings therethrough and the other pair of said levers having pins extending through said openings, said openings being of sufficient transverse extent to permit engagement of said companion cam surfaces on the two pairs of levers in the jaw closing action of the levers, and spring means supported between the levers and tensioned to hold the companion cam surfaces in engagement.

2. A cam closing hand tool comprising a pair of pivotally connected hand levers having longitudinally extending channels open at the pivotally connected ends of said levers, a pair of pivotally connected jaw levers entered in the open ends of said channels, the outer edges of said jaw levers and the inner surfaces of said channels in the hand levers having companion cam surfaces in rolling, sliding engagement in the closing action of the hand levers and jaw levers, one pair of said levers having transversely extended openings therethrough and the other pair of said levers having pins extending through said openings, said openings being of sufficient transverse extent to permit engagement of said companion cam surfaces on the two pairs of levers in the jaw closing action of the levers, and spring means supported between the levers and tensioned to hold the companion cam surfaces in engagement, the companion engaging cam surfaces being reversely convex.

3. A cam closing hand tool comprising a pair of pivotally connected hand levers having longitudinally extending channels open at the pivotally connected ends of said levers, a pair of pivotally connected jaw levers entered in the open ends of said channels, the outer edges of said jaw levers and the inner surfaces of said channels in the hand levers having companion cam surfaces in rolling, sliding engagement in the closing action of the hand levers and jaw levers, one pair of said levers having transversely extended openings therethrough and the other pair of said levers having pins extending through said openings, said openings being of sufficient transverse extent to permit engagement of said companion cam surfaces on the two pairs of levers in the jaw closing action of the levers, and spring means supported between the levers and tensioned to hold the companion cam surfaces in engagement, said openings being in the jaw levers and said pins being fixedly secured in said hand levers in position extending across the channels in said hand levers.

KARL J. KLENK.

References Cited in the file of this patent
UNITED STATES PATENTS

| Number | Name | Date |
| --- | --- | --- |
| 352,561 | Neff | Nov. 16, 1886 |
| 707,822 | Casterlin | Aug. 26, 1902 |
| 832,804 | Oneal et al. | Oct. 9, 1906 |
| 2,072,140 | Smith | Mar. 2, 1937 |